INVENTORS
VERNON R. PAWELSKY
LOURDES V. McCARTY
WILLIAM A. BIERMANN
JOHN T. DULAK
By John W. Michael
ATTORNEY

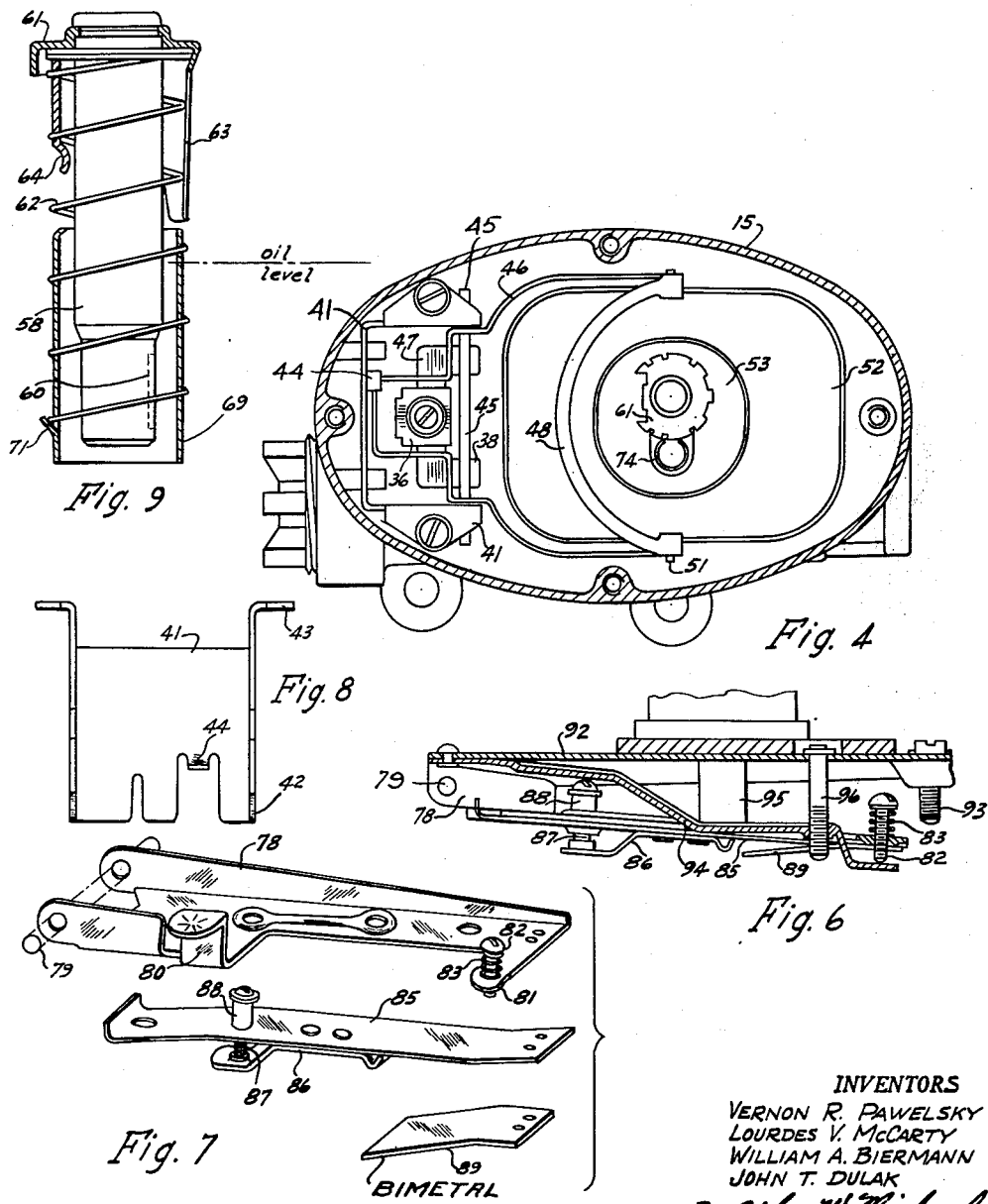

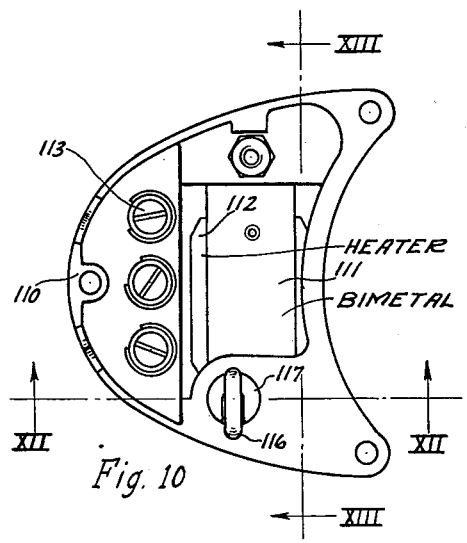
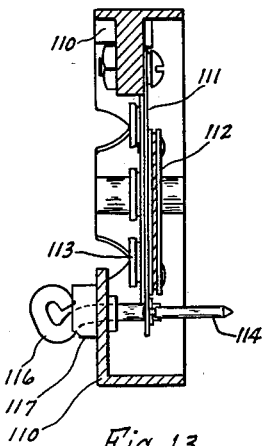
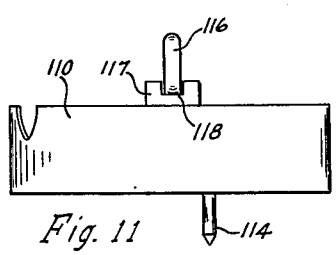
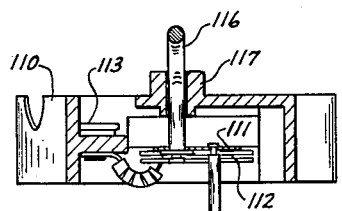
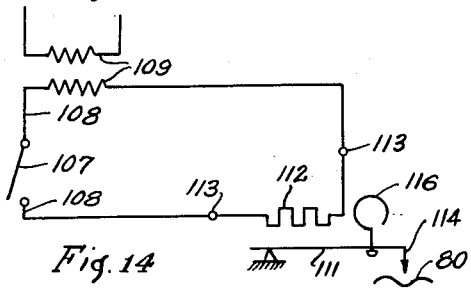
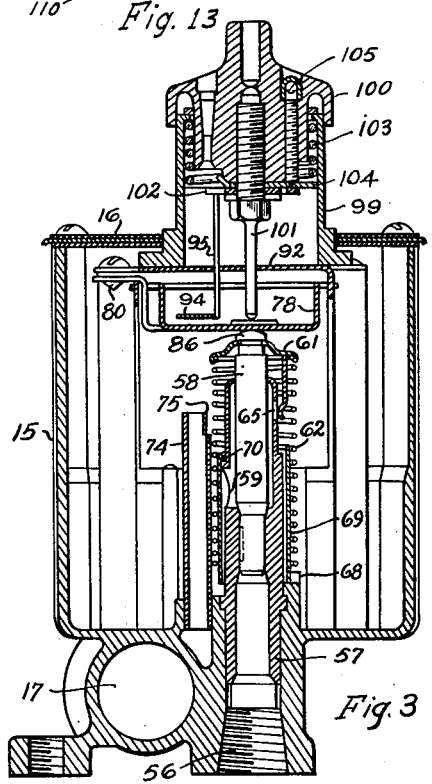

Patented Nov. 20, 1951

2,575,560

UNITED STATES PATENT OFFICE 2,575,560

LIQUID FLOW CONTROL DEVICE

Vernon R. Pawelsky, Lourdes V. McCarty, William A. Biermann, and John T. Dulak, Milwaukee County, Wis., assignors to A P Controls Corporation, a corporation of Wisconsin Application November 1, 1946, Serial No. 707,086

5 Claims. (Cl. 137—68)

This invention relates to improvements in liquid flow control devices of the constant level type and particularly to such devices designed particularly for operation on either land vehicles or boats.

It is therefore one object of the invention to provide a liquid flow control device, particularly for use on vehicles and having the simplest structure possible, with all the adjusting and limit setting means necessary for effective and safe operation.

Another object of the invention is to provide a liquid flow control device for use on vehicles and in which all of the moving elements of the device are so guided as to be unaffected by the position of the vehicles and the shocks and vibrations to which the vehicles may be subjected.

Another object of the invention is to provide a liquid flow control device of the constant level type in which entrance of foreign material into the device and particularly material which is buoyant in the liquid, cannot affect the operation of the device.

Another object of the invention is to provide a liquid flow control device of the constant level type which may be readily disassembled into a number of sub-assemblies and re-assembled without disturbing the various adjustments and positions required for proper operation of the device.

Another object of the invention is to provide a liquid flow control device in which the various sub-assemblies thereof are so mounted in the casing as to allow ready access particularly to the outflow valve and to the means for controlling the inflow valve, without disturbing the adjustments of such sub-assemblies themselves or their co-action.

A further object of the invention is to provide a liquid flow control device in which both the inlet and outlet valve are controlled by a single element under given conditions.

A further object of the invention is to provide a liquid flow control device which is operable either manually or automatically and in which the manual control means is immediately effective if the automatic control means fail in operation.

A further object of the invention is to provide a liquid flow control device of the constant level type particularly for use on vehicles of any character and capable of operation either manually or automatically and in which the automatically operable means are readily locked in such position as to avoid interference with the action of the manually operable means.

And a further object of the invention is to provide a liquid flow control device of the constant level type which is manually operable and may be made automatically responsive to a condition remote from the device and in which the device is easily adjusted to compensate for differences between the remote condition and a similar condition adjacent the device.

Objects and advantages, other than those above set forth, will be apparent from the following description when read in connection with the accompanying drawing, in which:

Fig. 3 is a vertical transverse sectional view taken on the plane of line III—III of Fig. 1 but omitting some parts for clarity in illustration;

Fig. 4 is a horizontal cross sectional view taken on the plane of line IV—IV of Fig. 2;

Fig. 6 is a vertical sectional view on substantially a central plane of control adjusting and control movement transmitting means in the device;

Fig. 7 is an isometric projection of portions of the control movement transmitting means;

Fig. 8 is an elevation of a bracket on which the control movement transmitting means are mounted;

Fig. 9 is an elevation with parts in vertical section and on an enlarged scale, of the valve controlling the discharge of liquid from the device;

Fig. 10 is a top plan view of a portion of means for automatically controlling the present device;

Fig. 11 is a side elevation of the structure illustrated in Figs. 10 and 12;

Fig. 12 is a cross sectional view taken on the plane of line XII—XII of Fig. 10;

Fig. 13 is a cross sectional view taken on the plane of line XIII—XIII of Fig. 10; and, Fig. 14 is a diagram illustrating the connections of the electrically energized portion of the device.

Figures 1, 2, 5:
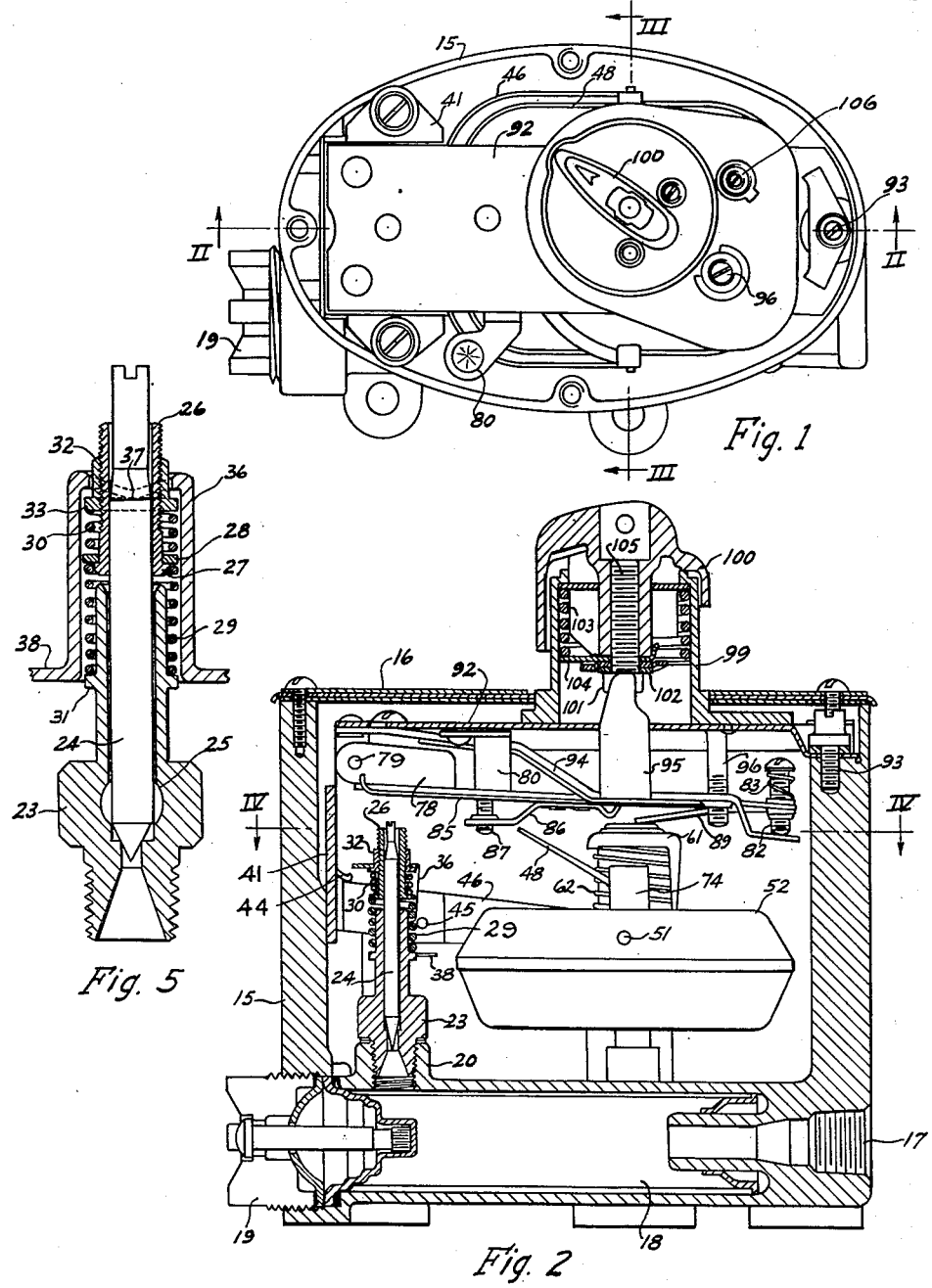
Fig. 1 is a top plan view of the device with the cover plates removed therefrom.
Fig. 2 is a vertical cross sectional view of the device taken on the plane of the line II—II of Fig. 1, but showing some portions of the device in elevation.
Fig. 5 is a vertical cross sectional view on an enlarged scale and on substantially a central plane through the valve controlling the flow of liquid into the device.

Generally, the device comprises a casing defining a chamber into which the flow of a liquid, such as fuel oil is controlled by an inlet valve urged into open position by a spring and having the degree of opening thereof controlled by a float acting on the valve to maintain a substantially constant liquid level in the casing. A discharge or outlet valve is located substantially at the geometrical center of the chamber with a metering slot at the center of gravity of the float, and is biased toward open position by a spring. The outlet valve is surrounded by a sleeve spaced therefrom whereby liquid entering the valve slot is taken from the liquid body only in a region above the bottom of the chamber and beneath the surface of the liquid. The degree of opening of the outlet valve slot is controlled by means divided into a plurality of separate sub-assemblies and provided with a plurality of adjustments for controlling the action and for limiting the action thereof on both of the valves. The control means is readily swung to one end of the casing or is completely removable from the structure without interference with any of the adjustments of such means. A single element in the control movement transmitting means is effective to control both the opening of the outlet valve and to limit the degree of opening of the inlet valve under given conditions. The device is provided with means for manually or automatically controlling the operation thereof and the manually operable means are immediately effective if the automatic means fail in operation. A special adjustment is provided for varying outlet valve opening if the device is to be responsive to a condition remote therefrom. All of the moving parts are guided on the casing and so placed with relation to each other that their movements will be unaffected by the position of the vehicle or by the shocks and vibrations to which the vehicle may be subjected.

Referring specifically to the drawings, the reference numeral 15 generally designates a casing which, in co-action with a cover plate or plates 16, defines a chamber in which the major portion of the remaining elements of the present device is enclosed. The casing has a passage 17 in the wall thereof for the flow of a liquid such as fuel oil, from a suitable source, the passage 17 having an enlarged portion receiving a well known type of strainer 18 retained in the passage by a cap nut 19 and readily removable and replaceable in the inlet passage. A hollow boss 20 is formed on the inlet passage wall and extends into the chamber for threadedly receiving a valve casing 23 in which a needle type of valve 24 is reciprocable. The conical surface forming the point of valve 24 may seat on an internal shoulder in the valve casing and controls the flow of oil from the inlet passage through an aperture 25 in the valve casing and into the casing 15. The portion of the valve 24, extending beyond the valve casing 23 has fixed thereon a sleeve 26 with a flange 27 at one end on which is placed a washer 28 serving as a seat for one end of each of two compression springs 29 and 30. The spring 29 rests at one end on an external flange 31 on the valve casing 23 and re-acts against such flange to tend to lift and open the inlet valve 24. A nut 32 with a square flange 33 is threaded on the sleeve 26 and is held in any desired position by the spring 30, acting between the seat 28 and the nut. A connector 36 of generally U-shape is formed with a hole in the bend of the U and with the material of the bend bent into V-shape to provide edges 37 bearing on the nut flange 33 when the connector is placed in an inverted position on the nut as shown. The legs of the connector are formed with projections or feet 38 extending laterally therefrom.

A bracket 41 (see Fig. 8) is fixed in the casing 15 to provide a plurality of pairs of ears 42 and 43 for severally receiving pivots and has a lug 44 formed from one side of the main body thereof. A pin 45 is insertable through the pivot ears 42 to support a yoke 46 having rounded projections 47 therefrom to bear on the feet 38 of the connector 36. The yoke is generally U-shaped and the ends thereof are connected by an arcuate bar 48 which is stiffly resilient to return the yoke ends to a given spacing after spreading to receive pivots 51 extending from the mid-points of the sides of a substantially rectangular float 52 which has an opening 53 substantially centrally therethrough. It will be noted that the bar 48 is spaced from and remains out of contact with the float at all times so that the resilience of the bar is always effective and so that bar action does not affect the pivoting of the float in the yoke.

Discharge of the liquid from the device is controlled by an outlet valve in the chamber and connecting with an outlet passage 56 through the wall of the casing 15. The outlet valve comprises a substantially tubular casing 57 suitably fixed in the outlet passage and adapted to receive a generally tubular valve 58 having a reduced size end to provide a shoulder seating on another shoulder formed in the interior of the valve casing. A hole 59 is provided through the wall of the valve casing immediately above the shoulder therein and intermediate the bottom of the chamber and the predetermined level of the liquid therein and is the only aperture for admitting liquid into the outlet valve casing. The reduced end of the outlet valve 58 has a slot formed therein by which the amount of liquid discharged through the valve may be accurately metered. A portion of the outlet valve 58 extends beyond the valve casing 57 and has mounted thereon a member 61 serving as a seat for one end of a compression spring 62 urging the valve toward open or unseated position. The spring seat member is formed with a plurality of fingers 63 and 64 for the several purposes of enclosing and guiding spring movement and of engaging a slot in the inlet valve casing 57 to limit the movement of the outlet valve in the opening direction and to prevent rotation of the valve. The outlet valve casing is so formed and placed that the hole 59 therein is always below the surface of the liquid regardless of the movement of the vehicle on which the device is mounted and the slot 60 is at the center of gravity of the float and alignable with hole 59.

A plurality of posts 68 extend from the bottom of the casing 15 outside the valve casing 57 to support the lower end of a sleeve 69 in spaced relation to the bottom of the casing 15. The sleeve is of such diameter as to define a material space between the valve casing and the sleeve and the spaced relationship at the upper end of the sleeve is maintained by lugs 70 struck inwardly from the upper edge thereof. Lugs 71 are also struck outwardly from the sleeve adjacent the lower end thereof to serve as a seat for one end of the valve spring 62. Hence, means are provided for allowing liquid flow into the outlet valve casing only by way of a given path and from below the surface of the liquid in the device and above the bottom thereof, thus preventing interference with the outlet valve by any foreign material in the liquid and particularly by material floating on the liquid surface. Such means include the sleeve and the various elements described for holding the sleeve in spaced relation with the outlet valve casing.

An overflow tube 74 is mounted in the casing 15 closely adjacent the outlet valve and is connected with an over-flow passage (not shown), in the wall of the casing. The side of the overflow tube nearest the outlet valve casing hole 59 is notched as at 75 to form a weir through which oil is discharged when the liquid level exceeds a predetermined height. It will be understood that the amount of the liquid admitted to the device is controlled, to maintain substantially a constant level, by the float acting on the valve as long as such float and valve function properly and that the over-flow is utilized only upon failure of functioning of the float and valve and of other means for closing the valve as described below.

The degree of opening of the outlet valve is controlled by either manually or automatically actuated means acting on a single movement transmitting means which (see Fig. 7 particularly) includes a plate 78 which is pivotally mounted on a pin 79 through bracket ears 43 which are adjacent one end of the casing 15 and the other end of the plate extends adjacent the other end of the casing and over both the inlet and outlet valves. The plate has an arm 80 with a cupped end off-set from one side of the main body of the plate and adapted to be acted upon by the automatic controls of Figs. 10–14 described hereinafter. An off-set ear 81 at the free end of the plate is threaded to receive a screw 82 held in adjusted position by a spring 83 for a purpose which will appear hereinafter. A leaf spring 85 is fixed at the free end of the plate 78 and extends longitudinally of the plate over both the valves. The leaf spring tends to flex upwardly against plate 78 and carries a member 86 having a V-shaped end bearing on the outlet valve while the other end of the member is threadedly engaged by a screw 87 extending through a sleeve 88 bearing on the spring. Adjustment of the screw 87 flexes the spring 85 to move the free end thereof away from the plate 78 and toward the inlet valve to secure simultaneous closing of both valves under certain conditions. A bimetal 89 is fixed, at one end, on the free end of the plate 78 and extends between the spring 85 and the outlet valve to vary the rate of opening of the valve dependent on ambient temperature and therefore to compensate for variations in liquid viscosity.

A second plate 92 is pivotally mounted on the pin 79 and when the device is in use, is fixed at its other end to the casing by a screw 93 extending through the plate. A stiffly resilient lever 94 extends from one end of the plate 92 and is formed with an ear 95 forming a part of the manual control means to be described. The position of the lever 94 is adjustable by means of a screw 96 seating on the plate 92 and threadedly engaging the lever adjacent its free end to limit the degree of closing of the outlet valve and hence fix the minimum discharge of liquid from the device. The free end of the lever 94 extends adjacent the ear 81 of the first plate 78 and is engageable by the end of the screw 82.

The manual control means for the device includes a tubular housing 99 mounted on the second plate 92 to receive a portion of a hand knob 100 and various elements associated therewith. The knob has fixed therein a stud 101 engageable by way of the spring 85 with the outlet valve and bears a cam 102 riding on the abutment 95. The knob and cam are urged toward the abutment by a compression spring 103 seating between the flanged end of housing 99 and a washer 104 fixed on the end of the knob. The cam 102 is a resilient spiral strip fixed on the knob at one end and is flexed by a screw 105 threaded into the knob and bearing on the cam to adjust the degree of curvature of the cam and hence the rate of movement of the stud upon rotation of the knob. Adjustment of the screw thus varies the rate of opening of the outlet valve. The degree of opening of the outlet valve is limited by a screw 106 threaded into the second plate 92 to limit upward movement of plate 78.

Thus rotation of the knob in the valve opening direction allows the outlet valve spring to move the valve upwardly in the opening direction up to the limit determined by screw 106. When the knob is rotated to close the valve, the cam action lowers pin 101 against spring 85 and lever 78, spring 85 and bimetal 89 move down, closing the valve, until set screw 82 strikes the end of lever 94. Continued closing rotation causes a rapid blow on spring 85 by pin 101 and, since lever 78 is now limited by screw 82 abutting lever 94, the movement pushes spring 85 down away from lever 78 so that the free end of the spring strikes the inlet valve while the V-shaped end of member 86 simultaneously strikes the outlet valve, thus closing both valves simultaneously.

If the device is to be automatically controlled as by the use of the well known type of thermostat 107 controlling the opening and closing of an electric circuit 108 connected by a transformer 109 with a source of electric current as is well known and shown diagrammatically only in Fig. 14, an electrically energized heat motor is mounted on the cover plate. Such heat motor comprises a housing of electrical insulating and heat resistive material in which is fixed one end of a bimetal 111 which warps in response to energization of heater 112 connected in the thermostat circuit by way of the terminals 113. A pin 114 is mounted in swiveling relation in the free end of the bimetal for engagement with the cupped surface of the plate ear 80. Closure of the electric circuit by the thermostat energizes the heater which warps the bimetal upwardly and allows the spring 62 to open the outlet valve. It will be understood that the heat motor, when unenergized, closes the outlet valve to its limit position for a minimum discharge. Hence, if automatic control of the device is not desired, means must be provided to move and hold the heat motor out of the valve closing position. A handle 116 is accordingly mounted in a boss 117 on the housing 110 and extends into position for engagement with the bimental to move the bimetal into an ineffective position. The boss 117 is notched as at 118 to receive a portion of the handle when the heat motor is to be operative and to allow the handle to ride out of the notch on to the end of the boss when the heat motor is to be inoperative. In the notched position the handle allows free movement of the heat motor while in the unnotched position the normal resilience of the bimetal causes the handle to bear firmly on the end of the boss so that shocks and vibrations will not cause movement of the handle and release the heat motor from its inoperative position.

The device is prepared for operation by various adjustments made at the factory to such extent that only minor changes need be made to meet particular conditions in use. The minimum and maximum flow limits are set by adjustment of screws 96 and 106 respectively and the rate of change of flow between such limits is determined by adjustment of screw 105. Screw 87 is adjustable to secure such flexing of the spring 85 as will make the control means effective to close both the valves under the conditions described. If the device is to be automatically controlled by the thermostatically controlled heat motor, the screws 82 and 106 are adjusted to permit such movement of the plate 78 relative to the plate 92 as will give that opening of the outlet valve required to produce a desired temperature about the thermostat regardless of the temperature about the flow control device itself.

It will be seen from the above description that the present structure provides means for limiting the region from which and the path by which liquid is allowed to flow to the outlet valve thereby preventing entry into the valve of foreign material either sinking to the bottom of the casing or floating on the surface of the liquid. The means controlling the opening of the outlet valve are divided into a number of sub-assemblies mounted on a plurality of plates which, without changing any of the adjustments thereof, may be pivoted to positions permitting access to the several valves. Such control means includes control motion transmitting means which may be adjusted for effecting closure of either the outlet valve only or of both valves. And finally, the device is provided with means for readily adapting the device to operation by an electric control means energized responsive to a condition remote from the device.

Although but one embodiment of the present invention has been illustrated and described it will be apparent to those skilled in the art that various changes and modifications may be made therein without departing from the spirit of the invention or from the scope of the appended claims.

We claim:

1. In a liquid flow control device of the constant level type, a casing receiving a flow of liquid, a valve metering the flow of liquid into the casing, a valve metering the flow of liquid out of the casing, both the valves being urged toward open position, a plate mounted in the casing, control means carried by the plate, a leaf spring mounted on the plate and adjustable to transmit the action of the control means to both valves, and means for adjusting the spring position to limit the action thereof on the inlet valve until the occurence of predetermined conditions.

2. In a liquid flow control device of the constant level type having a casing receiving a controlled flow of liquid, a valve controlling the flow of liquid out of the casing, a plate pivotally mounted on the casing for movement to vary the opening of the valve, manually operable means for varying the position of the plate, electrically energized means for varying the position of the plate, and means for matching the action of the electrically energized means to the movement of the manually operable means.

3. In a liquid flow control device of the constant level type having a casing receiving a controlled flow of liquid, a valve controlling the flow of liquid out of the casing, a plate pivotally mounted on the casing for movement to vary the opening of the valve, manually operable means for varying the position of the plate, electrically energized means for varying the position of the plate, a lever mounted in the casing, for adjustment to limit the opening of the valve, and a screw mounted in the plate for engagement with the lever for matching the action of the electrically energized means to the movement of the manually operable means.

4. In a liquid flow control device of the constant level type, a casing receiving a flow of liquid, a valve metering the flow of liquid into the casing, a valve metering the flow of liquid out of the casing, both the valves being urged toward open position, a plate mounted in the casing, control means carried by the plate, a leaf spring mounted on the plate and adjustable to transmit the action of the control means to both valves, and means for adjusting the spring position to limit the action thereof on the inlet valve until the occurrence of predetermined conditions, said plate being pivotally mounted in the casing for movement into an inactive position to expose the valves without disturbing the relationship of the plate, spring, and the adjusting and control means.

5. In a liquid flow control device, a casing having a float controlled inlet valve metering flow into the casing, an outlet valve biased to its open position and adapted to meter flow from the casing, a lever pivoted in the casing acting on the outlet valve and movable between upper and lower limit stops determinative of the maximum and minimum outlet flow, manually operable control means normally regulating movement of the lever between the limits, and means mounted on the lever and responsive to valve closing movement beyond the normal range to simultaneously close both valves.

VERNON R. PAWELSKY.
LOURDES V. McCARTY.
WILLIAM A. BIERMANN.
JOHN T. DULAK.

REFERENCES CITED

The following references are of record in the file of this patent:

UNITED STATES PATENTS

| Number | Name | Date |
| --- | --- | --- |
| 2,145,446 | Johnson | Jan. 31, 1939 |
| 2,183,815 | Johnson | Dec. 19, 1939 |
| 2,199,538 | Curry | May 7, 1940 |
| 2,293,903 | Johnson | Aug. 25, 1942 |
| 2,358,040 | Williams | Sept. 12, 1944 |
| 2,405,126 | Bates | Aug. 6, 1946 |